United States Patent [19]
Mihm

[11] Patent Number: 5,468,012
[45] Date of Patent: Nov. 21, 1995

[54] AIR BAG MODULE

[75] Inventor: Joseph J. Mihm, North Branch, Mich.

[73] Assignee: TRW Vehicle Safety Systems Inc., Lyndhurst, Ohio

[21] Appl. No.: 259,298

[22] Filed: Jun. 13, 1994

[51] Int. Cl.⁶ .................................................. B60R 21/16
[52] U.S. Cl. ...................................... 280/728.2; 280/741
[58] Field of Search ............................. 280/728 A, 732, 280/743 R, 741

[56] References Cited

U.S. PATENT DOCUMENTS

| | | | |
|---|---|---|---|
| 4,191,392 | 3/1980 | Barnett | 280/740 |
| 4,964,654 | 10/1990 | Bishop et al. | 280/728 A |
| 5,062,664 | 11/1991 | Bishop et al. | 280/728 A |
| 5,069,480 | 12/1991 | Good | 280/743 R |
| 5,149,130 | 9/1992 | Wooley et al. | 280/743 R |
| 5,234,227 | 8/1993 | Webber | 280/728 A |
| 5,257,815 | 11/1993 | Bachelder et al. | 280/728 A |

FOREIGN PATENT DOCUMENTS

0558240A1  1/1993  European Pat. Off. .

OTHER PUBLICATIONS

Twelve undated photographs of parts of a prior art air bag module.

*Primary Examiner*—Kenneth R. Rice
*Attorney, Agent, or Firm*—Tarolli, Sundheim & Covell

[57] ABSTRACT

An air bag module (10) comprises an inflatable vehicle occupant restraint (12), an inflator (18) having first and second axial end walls (64, 66), and a diffuser (20) having first and second end walls (90, 92). A chamber (94) extends between the first and second end walls (90, 92) of the diffuser (20). The first axial end wall (64) of the inflator (18) is supported in the chamber (94) at the first end wall (90) of the diffuser (20), and the second axial end wall (66) of the inflator (18) is supported in the chamber (94) at the second end wall (92) of the diffuser (20). The module (10) further includes an end cap (26) which is fastened to the first end wall (90) of the diffuser (20) in a fastened position. The end cap (26) imparts an axially directed supporting force to the inflator (18). The supporting force urges the inflator (18) axially inward of the chamber (94) at the first end wall (90) of the diffuser (20), and urges the inflator (18) axially outward of the chamber (94) at the second end wall (92) of the diffuser (20).

18 Claims, 5 Drawing Sheets

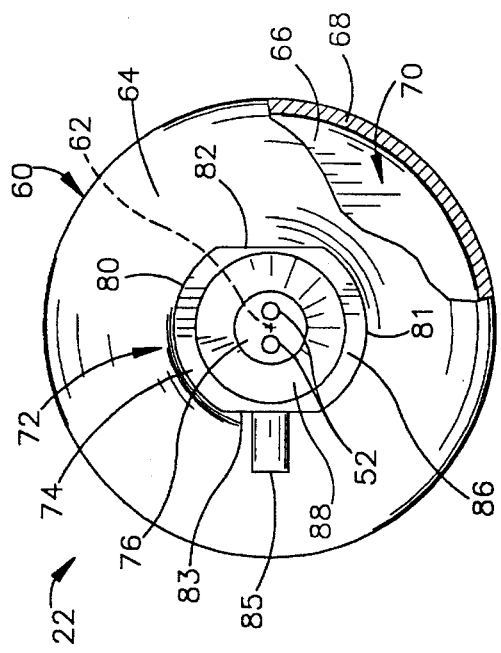
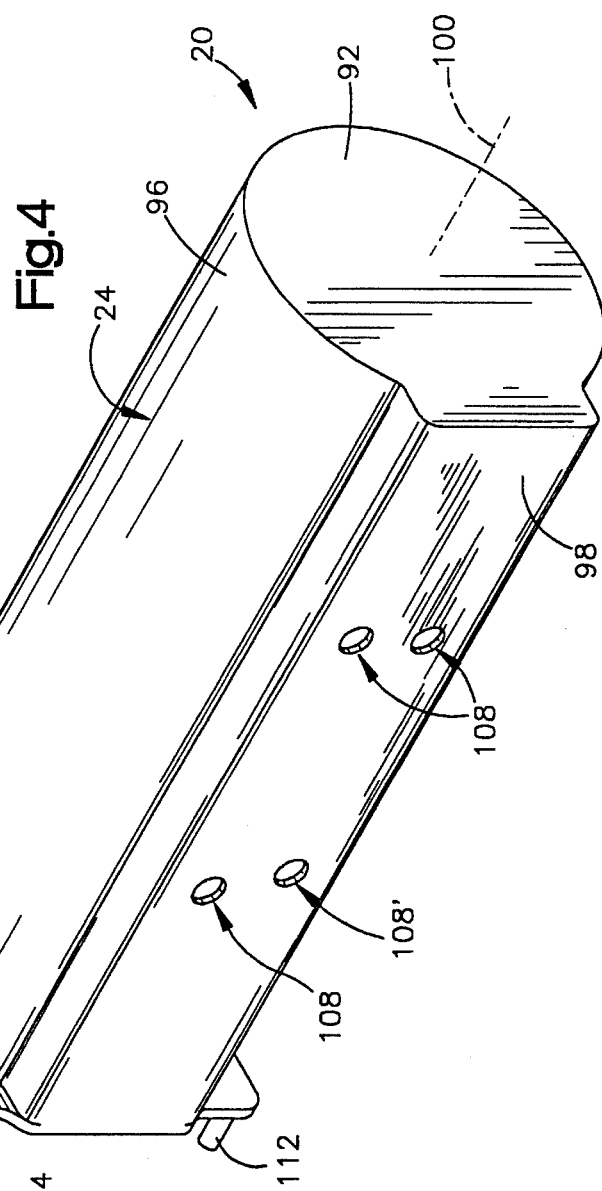
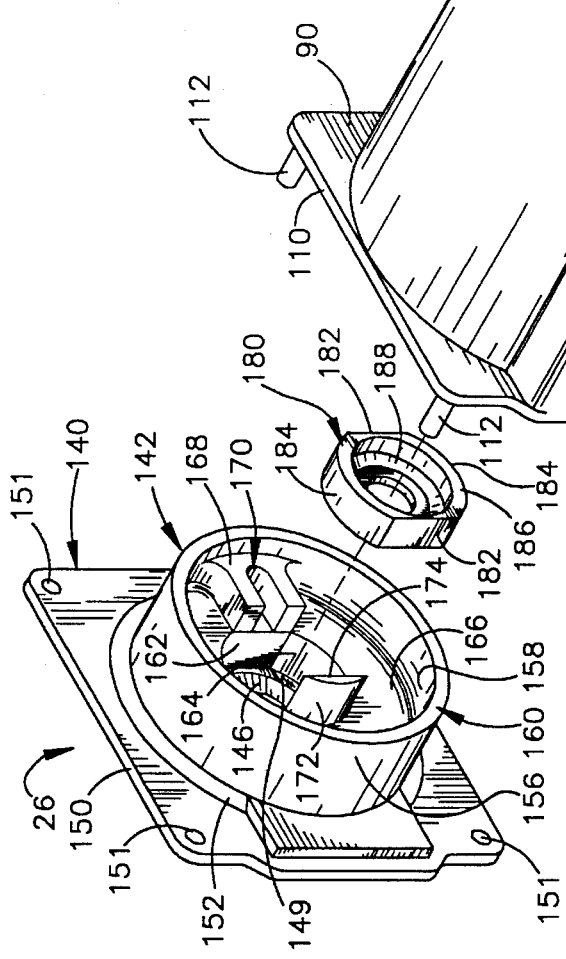

5,468,012

AIR BAG MODULE

FIELD OF THE INVENTION

The present invention relates to an air bag for restraining an occupant of a vehicle, and particularly relates to an air bag module including an air bag and an inflator for inflating the air bag.

BACKGROUND OF THE INVENTION

An air bag for restraining an occupant of a vehicle is inflated upon the occurrence of a vehicle collision. Inflation fluid is directed to flow from a source of inflation fluid into the air bag to inflate the air bag. The inflation fluid inflates the air bag from a stored condition to an inflated condition in which the air bag extends into the vehicle occupant compartment. When the air bag is inflated into the vehicle occupant compartment, it restrains an occupant of the vehicle from forcefully striking parts of the vehicle.

The air bag is stored in an air bag module which is mounted in the vehicle. In addition to the air bag, the module contains an inflator and may contain a diffuser. The inflator comprises the source of inflation fluid. The diffuser, if included, helps to direct the inflation fluid from the inflator into the air bag when the inflator is actuated. Typically, an air bag module also includes a canister which contains the air bag, the inflator and the diffuser. The canister is mounted in the part of the vehicle in which the air bag is to be located, such as the instrument panel of the vehicle, and is covered by a deployment door which opens upon inflation of the air bag.

SUMMARY OF THE INVENTION

In accordance with the present invention, an air bag module comprises an inflatable vehicle occupant restraint and an inflator means for providing inflation fluid for inflating the restraint. The inflator means comprises an inflator having an axis, first and second axial end portions, and at least one fluid outlet opening.

The module further comprises a diffuser structure having first and second end portions. The diffuser structure defines a chamber between the first and second end portions, and includes a fluid outlet means for directing the inflation fluid to flow outward from the chamber. Supporting means supports the first axial end portion of the inflator at the first end portion of the diffuser structure, and supports the second axial end portion of the inflator at the second end portion of the diffuser structure.

The supporting means includes an end cap and means for fastening the end cap to the first end portion of the diffuser structure in a fastened position. When the end cap is in the fastened position, it imparts an axially directed supporting force to the inflator. The supporting force urges the inflator axially inward of the chamber at the first end portion of the diffuser structure, and urges the inflator axially outward of the chamber at the second end portion of the diffuser structure.

In a preferred embodiment of the present invention, the inflator is movable axially into the chamber in a direction extending from the first end portion of the diffuser structure toward the second end portion of the diffuser structure. The end cap is movable into the fastened position in the same direction. The end cap has a surface which faces in that direction, and which directs the supporting force against the first axial end portion of the inflator upon such movement of the end cap into the fastened position.

BRIEF DESCRIPTION OF THE DRAWINGS

Further features of the present invention will become apparent to those skilled in the art to which the present invention relates from reading the following description with reference to the accompanying drawings, in which:

FIG. 4 is a view taken on line 4—4 of FIG. 3;

FIG. 6 is an exploded perspective view of parts shown in FIG. 3.

DESCRIPTION OF A PREFERRED EMBODIMENT

Figure 1:
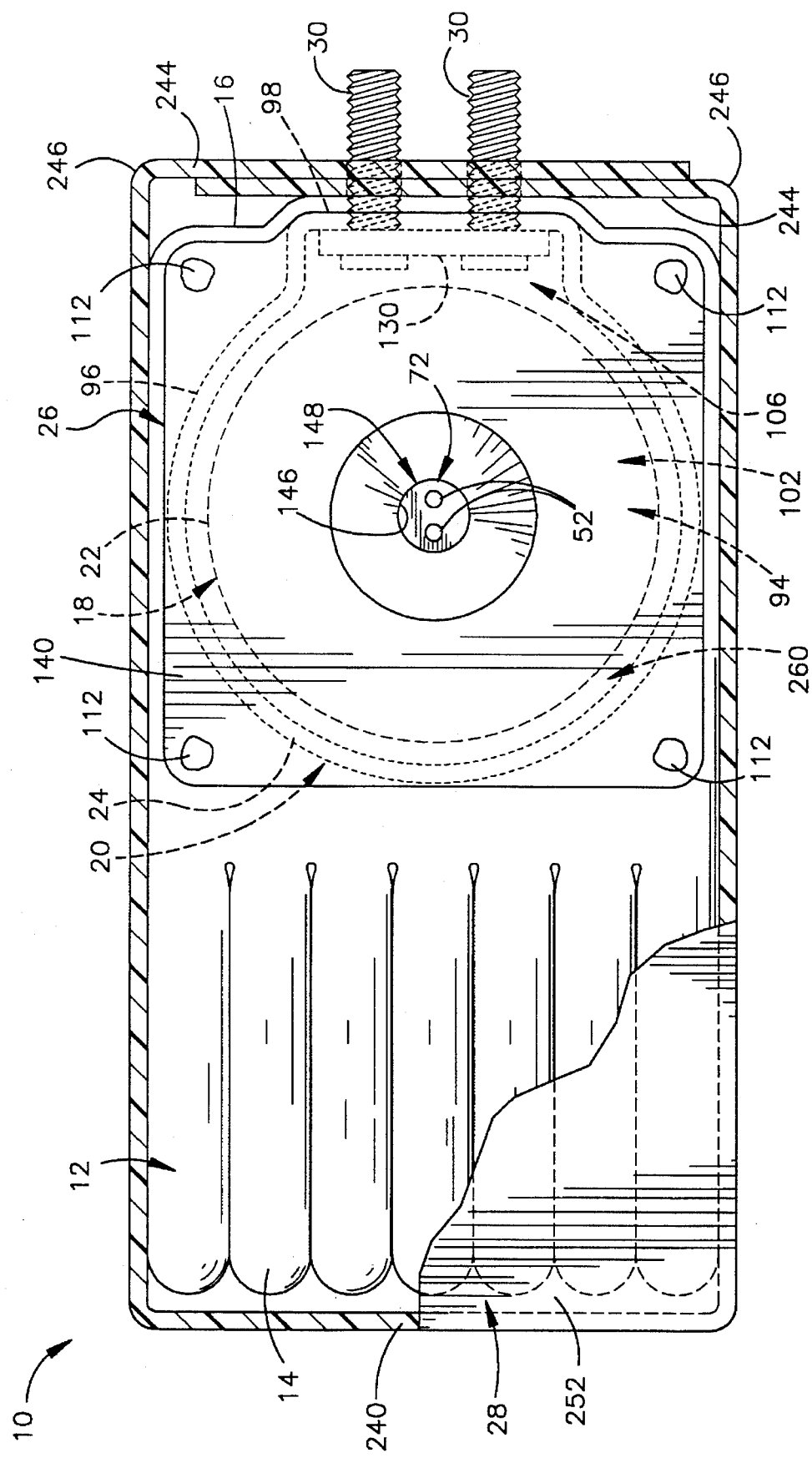
FIG. 1 is a side view of an air bag module comprising a preferred embodiment of the present invention.

An air bag module 10 comprising a preferred embodiment of the present invention is shown in FIG. 1. The module 10 includes an inflatable vehicle occupant restraint 12 which is commonly referred to as an air bag. The air bag 12 has a folded forward end portion 14 which comprises the major portion of the air bag 12. The air bag 12 also has a smaller, rear end portion 16 which contains other parts of the module 10. Such other parts of the module 10 include an inflator 18 for providing inflation fluid, and a diffuser 20 for directing the inflation fluid from the inflator 18 into the air bag 12.

The inflator 18 comprises a cylindrical pressure vessel 22. Surrounding but spaced radially from the pressure vessel 22 is a tubular body wall 24 of the diffuser 20. An end cap 26 closes an open end of the diffuser 20 through which the pressure vessel 22 is received. The module 10 further includes a cover 28 which encloses the air bag 12, the inflator 18, and the diffuser 20.

Figure 2:
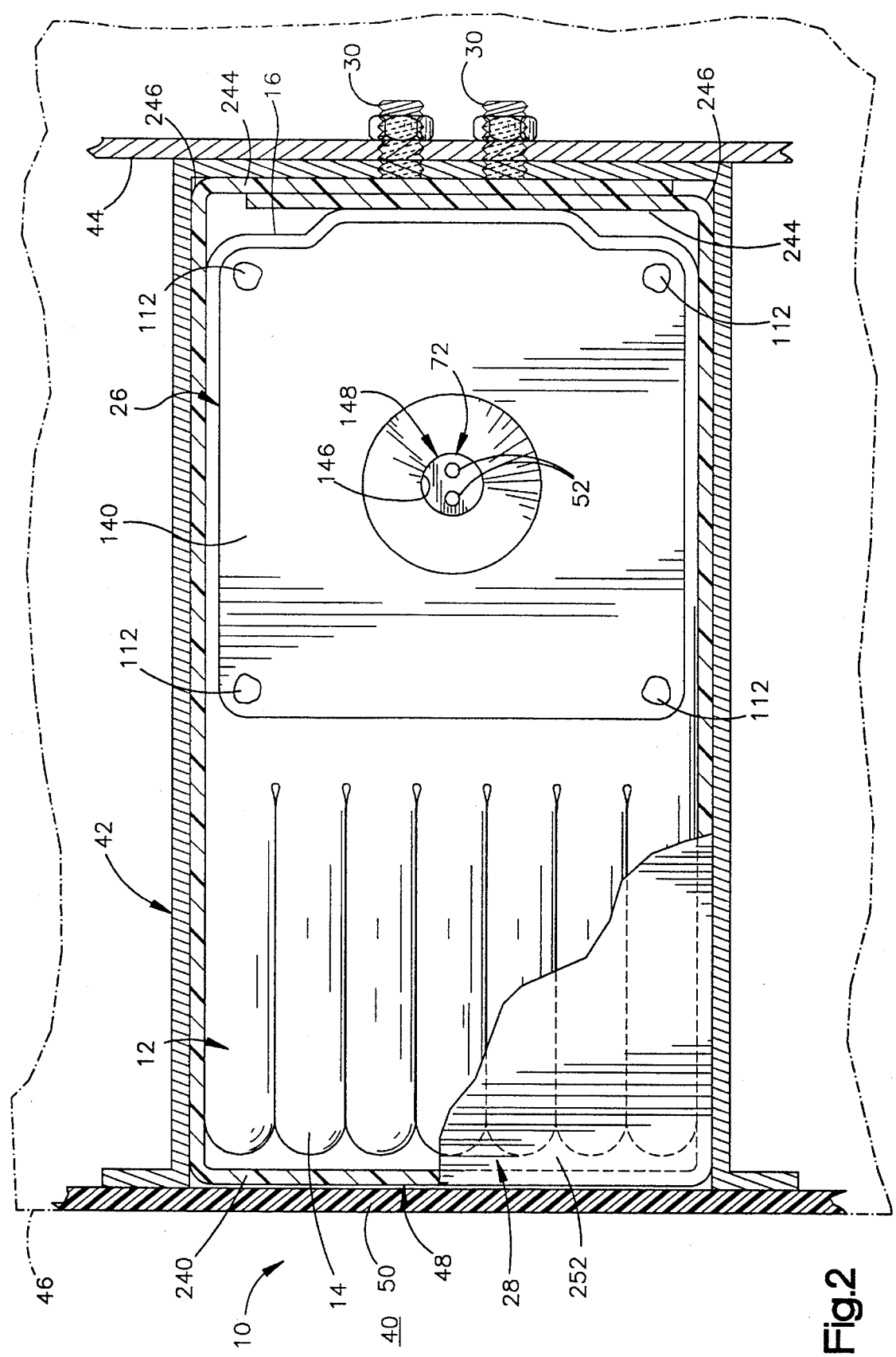
FIG. 2 is a view of the module of FIG. 1 installed in a vehicle.

As further shown in FIG. 1, a plurality of steel mounting bolts 30 project from the rear end of the module 10. As shown in FIG. 2, the mounting bolts 30 are designed to mount the module 10 in a vehicle in a position adjacent to the vehicle occupant compartment 40. In the preferred embodiment of the present invention shown in the drawings, the mounting bolts 30 are designed to support the module 10 in a reaction canister 42, and further to support the reaction canister 42 on a portion 44 of the vehicle instrument panel 46 or a portion of a cross-vehicle beam. When the module 10 is thus supported in the vehicle, the forward end portion 14 of the air bag 12 is located adjacent to a deployment opening 48 at the forward end of the reaction canister 42. A deployment door 50 of known construction extends over the deployment opening 48 and conceals the module 10 from the vehicle occupant compartment 40.

Although the mounting bolts 30 in the preferred embodiment of the invention are designed to support both the module 10 and the reaction canister 42 in the vehicle, they could alternatively be designed only to support the module 10 in the reaction canister 42. Other fasteners would then be used to support the reaction canister 42 in the vehicle. Such other fasteners could have any suitable structure known in the art. Still further, the reaction canister 42 could be formed as an integral portion of the instrument panel 46, rather than as a separate structure. If a separate reaction canister 42 is used, the module 10 constructed in accordance with the present invention can be inserted into the reaction canister 42 either before or after the reaction canister 42 is placed in the vehicle.

The inflator 18 is actuated upon the passage of electric current between a pair of electrical contact pins 52 at one end of the pressure vessel 22. When the inflator 18 is actuated, it provides inflation fluid which, as noted above, is directed into the air bag 12 by the diffuser 20. As the inflation fluid begins to inflate the air bag 12, it moves the forward end portion 14 of the air bag 12 forcefully against the cover 28 and the deployment door 50 at the deployment opening 48 in the reaction canister 42. The cover 28 and the deployment door 50 rupture under the stress induced by the pressure of the inflation fluid in the air bag 12, and thus release the forward end portion 14 of the air bag 12 for movement into the vehicle occupant compartment 40 through the deployment opening 48. When the forward end portion 14 of the air bag 12 is thus inflated into the vehicle occupant compartment 40, it restrains an occupant of the vehicle from forcefully striking the instrument panel 46 or other parts of the vehicle.

A stress riser (not shown) of known construction, such as a thinned or notched section of material, is preferably included in the deployment door 50 so as to cause the deployment door 50 to rupture and move pivotally out of the path of the inflating air bag 12 in a desired configuration. A stress riser may also be included in the plastic cover 28. However, the cover 28 is preferably constructed as a thin-walled structure which ruptures readily under the pressure of the inflation fluid without the use of a stress riser. The material of which the cover 28 is formed is preferably a thermoplastic material, such as the thermoplastic material marketed by E. I. DuPont de Nemours & Co. under the trademark TYVEK. The cover 28 may alternatively be formed as a shrink wrap of plastic film.

Figure 3:
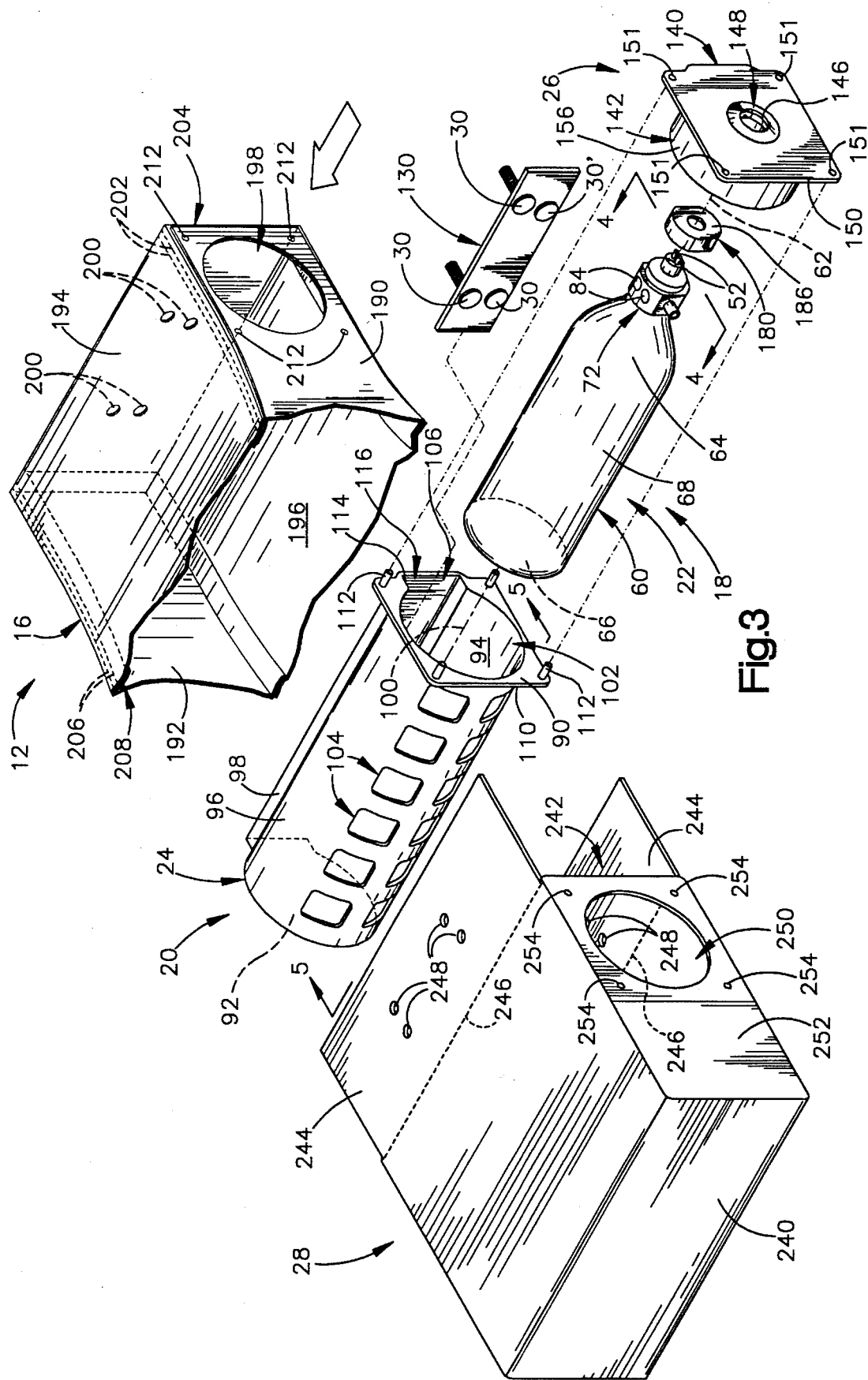
FIG. 3 is an exploded perspective view of parts of the module of FIG. 1.

As shown in greater detail in FIGS. 3 and 4, the pressure vessel 22 includes an elongated cylindrical container 60 with a longitudinal central axis 62. The container 60 is preferably formed of steel or aluminum. A first end wall 64 of the container 60 has a necked-down shape centered on the axis 62. A second end wall 66 of the container 60 has a circular shape centered on the axis 62. A longitudinal body wall 68 extends concentrically between the first and second end walls 64 and 66. The walls 64–68 of the container 60 together define an elongated cylindrical storage chamber 70 which contains pressurized inflation fluid for inflating the air bag 12.

The inflation fluid contained in the storage chamber 70 may have any suitable composition known in the art, but preferably comprises a combustible mixture of gases in accordance with the invention set forth in copending U.S. patent application Ser. No. 947,147, filed Sep. 18, 1992, entitled "Apparatus for Inflating a Vehicle Occupant Restraint Using an Inflammable Gas Mixture," and assigned to TRW Vehicle Safety Systems Inc. The storage chamber 70 is closed by a rupturable closure wall (not shown) of the container 60. The rupturable closure wall of the container 60 may have any suitable structure known in the art, but is preferably constructed in accordance with the invention set forth in copending U.S. patent application Ser. No. 166,521, filed Dec. 13, 1993, entitled "Apparatus and Method for Inflating an Inflatable Vehicle Occupant Restraint," and also assigned to TRW Vehicle Safety Systems Inc.

The pressure vessel 22 further includes an actuator assembly 72 which is mounted on the first end wall 64 of the container 60. The actuator assembly 72 includes a manifold 74 and a pyrotechnic squib 76. The squib 76 is a known device which includes the electrical contact pins 52, and is actuated upon the passage of electric current between the pins 52. The manifold 74 contains other parts (not shown) of the actuator assembly 72 that cooperate with the squib 76 so as to rupture the rupturable closure wall of the container 60 when the squib 76 is actuated. Such other parts of the actuator assembly 72 also may be constructed as known in the art, but are preferably constructed in accordance with the invention set forth in copending U.S. patent application Ser. No. 166,521, identified fully above.

The manifold 74 also is preferably formed of steel or aluminum, and is secured to the first end wall 64 of the container 60 by screw threads (not shown) in a known manner. As best shown in FIG. 4, the manifold 74 has a pair of diametrically opposed arcuate outer surfaces 80 and 81, and has a pair of diametrically opposed flat outer surfaces 82 and 83. A plurality of fluid outlet openings 84 (FIG. 3) at the arcuate outer surfaces 80 and 81 communicate with the rupturable closure wall of the container 60 so as to direct the inflation fluid radially outward from the manifold 74 when the air bag 12 is to be inflated. The first flat outer surface 82 is somewhat larger than the second flat outer surface 83, and lies in a plane that is spaced radially from the axis 62 of the container 60. The second flat outer surface 83 also lies in a plane that is spaced radially from the axis 62, and is parallel to the first flat outer surface 82. An alignment pin 85 projects radially outward from the second flat outer surface 83. The alignment pin 85 is preferably formed of steel or aluminum to match the material of the manifold 74, and is fixed to the manifold 74. The manifold 74 also has an annular outer end surface 86 and a frustoconical outer end surface 88, both of which face axially away from the container 60.

Figure 5:
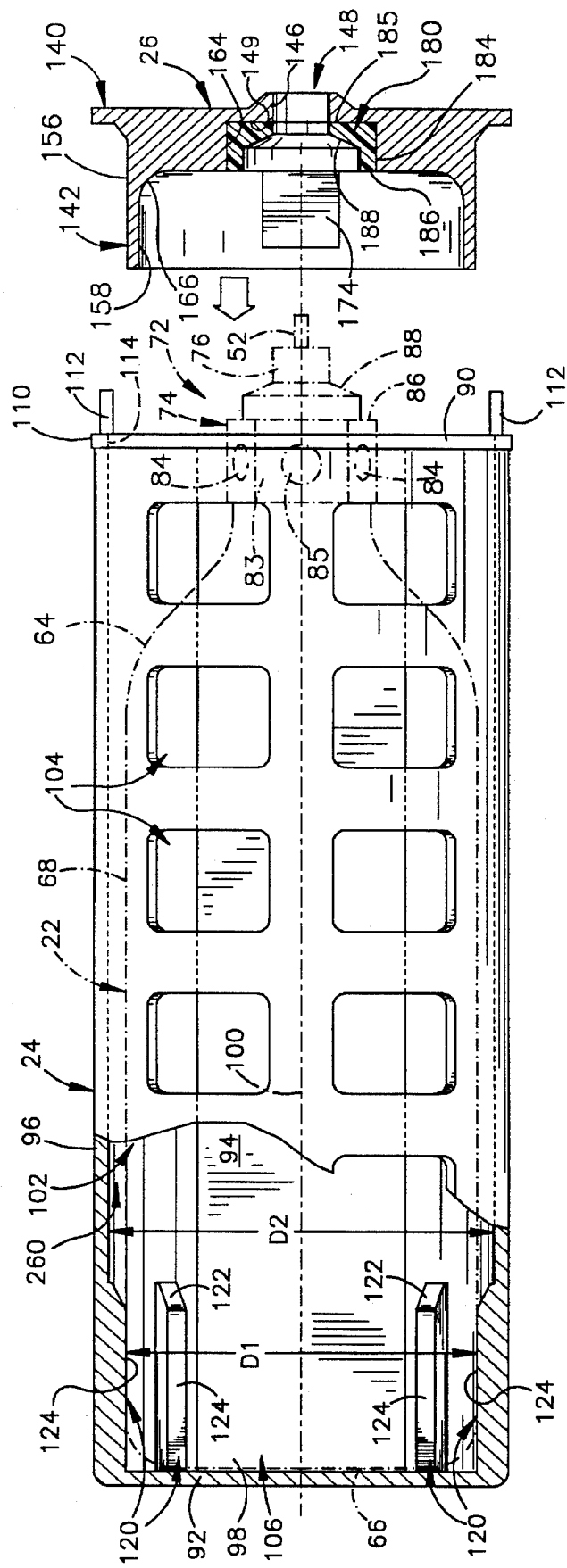
FIG. 5 is a view taken on line 5—5 of FIG. 3.

As shown in FIGS. 3, 5 and 6, the diffuser 20 has a first end wall 90 at one end of the tubular body wall 24, and has a second end wall 92 at the opposite end of the tubular body wall 24. The diffuser 20 defines an elongated chamber 94 which extends longitudinally through the tubular body wall 24 from the first end wall 90 to the second end wall 92. The diffuser 20 is preferably formed in a single piece as a casting of aluminum or magnesium, or as a composite such as a composite of plastic reinforced with glass fibers. Alternatively, the diffuser 20 could be formed of steel, with separate steel pieces defining the walls 24, 90 and/or 92.

As best shown in FIG. 6, the tubular body wall 24 of the diffuser 20 has a major wall portion 96 and a minor wall portion 98. The major wall portion 96 has a shape which approaches that of an elongated cylinder centered on a longitudinal central axis 100. The major wall portion 96 thus defines an elongated, cylindrically shaped portion 102 (FIG. 3) of the chamber 94. A plurality of diffuser openings 104 extend through the major wall portion 96 at the front side of the diffuser 20. The minor wall portion 98 interrupts the major wall portion 96 circumferentially at the rear side of the diffuser 20, and has the shape of a rectangular channel which is elongated in the direction of the axis 100. The minor wall portion 98 thus defines an elongated rectangular portion 106 (FIG. 3) of the chamber 94 which adjoins the cylindrically shaped portion 102 at the rear side of the diffuser 20.

As further shown in FIG. 6, four apertures 108 extend through the minor wall portion 98 of the diffuser 20. The apertures 108 are arranged on the minor wall portion 98 in an asymmetrical array in which one of the apertures 108' is offset slightly from the corner of an otherwise rectangular array.

The first end wall 90 of the diffuser 20 has a peripheral edge surface 110. The peripheral edge surface 110 defines four corners of the first end wall 90 at locations radially outward of the tubular body wall 24. Four fastener pins 112 project outward from the first end wall 90, with each the four fastener pins 112 being located adjacent to a respective one of the four corners of the first end wall 90. An inner edge surface 114 of the first end wall 90 follows the contour of the major and minor portions 96 and 98 of the tubular body wall 24. The inner edge surface 114 thus defines an opening 116 into the chamber 94 which is fully open at both the cylindrical and rectangular portions 102 and 106 of the chamber 94.

The second end wall 92 of the diffuser 20 is coextensive with the tubular body wall 24 about the periphery of the tubular body wall 24, and is fully continuous transversely across the chamber 94. The second end wall 92 thus closes the chamber 94 fully across both the cylindrical and rectangular portions 102 and 106 of the chamber 100.

The diffuser 20 further includes a plurality of ribs 120 projecting radially inward from the major portion 96 of the tubular body wall 24, as shown in FIG. 5. Each of the ribs 120 has a tapered end surface 122, and has an elongated inner surface 124 which extends axially from the second end wall 92. The elongated inner surfaces 124 of the ribs 120 define a reduced diameter $D_1$ of the cylindrical portion 102 of the chamber 94. The reduced diameter $D_1$ is equal to the outer diameter of the longitudinal body wall 68 of the container 60, and is less than the full diameter $D_2$ of the cylindrical portion 102 of the chamber 94.

As shown in FIG. 3, the module 10 further includes a steel fastener strip 130 which supports the mounting bolts 30. Each of the mounting bolts 30 extends through a respective aperture (not shown) in the fastener strip 130 in an interference fit, but could alternatively be fixed to the fastener strip 130 by a weld. The four mounting bolts 30 are arranged on the fastener strip 130 in the same asymmetrical array in which the four apertures 108 (FIG. 6) are arranged on the minor wall portion 98 of the diffuser 20.

As shown in FIG. 1, the fastener strip 130 is closely received in the rectangular portion 106 of the chamber 94 in the diffuser 20. The mounting bolts 30 extend outward through the apertures 108 in the minor wall portion 98 of the diffuser 20 in interference fits which hold the fastener strip 130 in abutting engagement with the minor wall portion 98. As indicated in FIG. 2, the asymmetrical arrangement of the mounting bolts 30 corresponds with an asymmetrical arrangement of apertures that are aligned to receive the mounting bolts 30 in the reaction canister 42 and the vehicle part 44. This ensures that the module 10 will be oriented correctly when mounted in the vehicle.

The end cap 26 is preferably formed of the same material of which the diffuser 20 is formed. As shown in FIGS. 3 and 6, the end cap 26 includes a flange 140 and a cylindrical body 142 projecting from the flange 140. An annular inner edge surface 146 of the flange 140 defines a circular access opening 148 extending through the center of the flange 140. The access opening 148 provides access to the electrical contact pins 52, as shown in FIGS. 1 and 2. An annular inner side surface 149 (FIG. 6) of the flange 140 surrounds the access opening 148. The flange 140 further has a peripheral edge surface 150 with a contour closely matching the contour of the peripheral edge surface 110 of the first end wall 90 of the diffuser 20. The peripheral edge surface 150 thus defines four corners of the flange 140. Four apertures 151 extend through the flange 140, each near a respective one of the four corners of the flange 140. A raised edge surface 152 (FIG. 6) of the flange 140 has a contour which closely matches the contour of the inner edge surface 114 of the first end wall 90 of the diffuser 20.

The cylindrical body 142 of the end cap 26 has a cylindrical outer surface 156 with a diameter nearly equal to the full diameter $D_2$ (FIG. 5) of the cylindrical portion 102 of the chamber 94 in the diffuser 20. A cylindrical inner surface 158 of the body 142 extends inward from an open end 160 of the body 142. The body 142 further has a pair of diametrically opposed flat inner surfaces 162, and an adjoining pair of diametrically opposed arcuate inner surfaces 164, with one of each being visible in FIG. 6. The inner surfaces 162 and 164 extend from the flange 140 toward the open end 160 of the body 142. Another arcuate inner surface 166 extends from the adjoining pairs of inner surfaces 162 and 164 to the cylindrical inner surface 158. The arcuate inner surface 166 has a concave contour facing outward toward the open end 160.

As further shown in FIG. 6, a U-shaped alignment structure 168 on the end cap 26 defines a slot 170 which extends radially outward from a location adjacent to one of the flat inner surfaces 162. An alignment tab 172 on the end cap 26 has a flat inner surface 174 facing radially inward at a location diametrically opposite the slot 170.

An annular elastomeric seal 180 is receivable in the cylindrical body 142 of the end cap 26. As shown in FIG. 6, the seal 180 has a pair of diametrically opposed flat outer surfaces 182, and has an adjoining pair of diametrically opposed arcuate outer surfaces 184. The outer surfaces 182 and 184 of the seal 180 register with the inner surfaces 162 and 164 of the end cap 26, respectively, upon insertion of the seal 180 into the body 142 of the end cap 26. The seal 180 further has an annular outer side surface 185 which abuts the annular inner side surface 149 of the end cap 26 when the seal 180 is received in the end cap 26, as shown in FIG. 5. An annular inner side surface 186 and a frustoconical inner surface 188 of the seal 180 then face toward the open end 160 of the end cap 26.

The rear end portion 16 of the air bag 12 is shown in greater detail in FIG. 3. The rear end portion 16 is defined by first, second, and third fabric panels 190, 192, and 194. The three panels 190–194 together define a compartment 196 within the rear end portion 16 of the air bag 12. The first fabric panel 190 preferably includes two plies of fabric material, and has an opening 198. The second fabric panel 192 also preferably includes two plies of fabric material. The third fabric panel 194 preferably includes two plies of fabric material, and has four apertures 200. The fabric material of which the panels 190–194 are formed may have any suitable composition and structure known in the art.

The first and third fabric panels 190 and 194 are fastened to each other by stitches 202 at a seam 204. The seam 204 extends fully about the periphery of the first fabric panel 190 at one side of the third fabric panel 194. The second and third fabric panels 192 and 194 are similarly fastened to each other by stitches 206 at a seam 208. The seam 208 extends fully about the periphery of the second fabric panel 190 at the other side of the third fabric panel 194. When the third fabric panel 194 is thus fastened to the first and second fabric panels 190 and 192 at the seams 204 and 208, it extends continuously and seamlessly around the rear end portion 16 of the air bag 12 between the first and second fabric panels 190 and 192.

Before the first fabric panel 190 or the second fabric panel 192 is fastened to the third fabric panel 194 fully about its periphery as described above, the diffuser 20 (containing the fastener strip 130 and the mounting bolts 30) is moved longitudinally past the fabric panel 190 or 192 and into the compartment 196 through an incomplete seam 204 or 208 that fastens the fabric panel 190 or 192 to the third fabric panel 194. The mounting bolts 30 projecting from the rear end of the diffuser 20 are then received through the apertures 200 in the third fabric panel 194 so as to extend outward from the rear end portion 16 of the air bag 12, as shown in FIGS. 1 and 2. After the diffuser 20 is thus installed in the compartment 196 in the air bag 12, the fabric panel 190 or 192 is fastened to the third fabric panel 194 fully about its periphery at the seam 204 or 208. The opening 116 in the first end wall 90 of the diffuser 20 is then aligned with the opening 198 extending through the first fabric panel 190. Additionally, the four fastener pins 112 projecting from the first end wall 90 of the diffuser 20 are received through four apertures 212 in the first fabric panel 190.

After the diffuser 20 has been installed in the compartment 196 in the air bag 12 in the foregoing manner, the forward end portion 14 of the air bag 12 is folded into an appropriate configuration, such as the one shown in FIG. 1. The folded forward end portion 14 of the air bag 12 is thus located adjacent to the diffuser openings 104 at the front side of the diffuser 20. The entire air bag 12 is then inserted into the cover 28 so as to be enclosed within the cover 28.

As shown in FIG. 3, the cover 28 in the preferred embodiment of the invention is shaped as a rectangular box. A closure wall 240 of the cover 28 closes the forward end of the cover 28. An opening 242 and a pair of closure flaps 244 are located at the rear end of the cover 28. The folded air bag 12, with the diffuser 20 contained in the compartment 196, is moved to into the cover 28 through the opening 242 at the rear end of the cover 28. The forward end portion 14 of the air bag 12 is then located adjacent to the closure wall 240 at the forward end of the cover 28. The closure flaps 244 are then folded pivotally about hinge lines 246 to close the opening 242. Apertures 248 are provided through the closure flaps 244 so that the mounting bolts 30 can project outward from the rear end of the cover 28, as shown in FIG. 1. The openings 116 and 198 in the diffuser 20 and the air bag 12, respectively, are aligned with an opening 250 in a side wall 252 of the cover 28. The fastener pins 112 on the diffuser 20 are received through apertures 254 in the side wall 252 of the cover 28.

When the diffuser 20, the air bag 12, and the cover 28 have been assembled together as described above, the pressure vessel 22 is moved longitudinally into the chamber 94 in the diffuser 20 through the aligned openings 116, 198 and 250 in the diffuser 20, the air bag 12 and the cover 28, respectively, in the direction of the arrow shown in FIG. 3. The pressure vessel 22 is thus moved into the position shown in dashed lines in FIG. 5. Specifically, the pressure vessel 22 is moved longitudinally into the chamber 94 from the first end wall 90 of the diffuser 20 toward the second end wall 92 of the diffuser 20. The tapered end surfaces 122 of the ribs 120 direct the container 60 to move into sliding engagement with the elongated inner surfaces 124 of the ribs 120. The ribs 120 thus guide the second end wall 64 of the container 60 to move coaxially toward the second end wall 92 of the diffuser 20, and also support the container 60 in a position centered on the axis 100. When the container 60 is thus supported by the ribs 120, a fluid flow space 260 is defined radially outward of the container 60 in the chamber 94. The fluid flow space 260 is defined in the cylindrical portion 102 of the chamber 94 as a result of the difference between the reduced diameter $D_1$ and the full diameter $D_2$ of the cylindrical portion 102 of the chamber 94. The fluid flow space 260 thus extends circumferentially around the container 60 in the cylindrical portion 102 of the chamber 94. As shown in FIG. 1, the fluid flow space 260 continues circumferentially around the container 60 through the rectangular portion 106 of the chamber 94.

When the pressure vessel 22 has been inserted in the chamber 94 in the diffuser 20 in the foregoing manner, the end cap 26 is fastened to the first end wall 90 of the diffuser 20. The end cap 26 then closes the opening 116 in the first end wall 90. More specifically, the end cap 26 is placed in a fastened position, as shown in FIGS. 1 and 2, in which the flange 140 on the end cap 26 overlies the first end wall 90 of the diffuser 20. The fastener pins 112 projecting from the first end wall 90 are then received through the apertures 151 in the flange 140. The free ends of the fastener pins 112 are rolled, peened, or otherwise formed back against the flange 140 so as to secure the end cap 26 to the diffuser 20. Screw threaded fasteners or the like could be used in place of the deformable fastener pins 112. The flange 140 on the end cap 26 then overlies a portion of the side wall 252 of the cover 28 which surrounds the opening 250, and also overlies an adjacent portion of the first fabric panel 190 which surrounds the opening 198. The end cap 26 thus clamps those portions of the cover 28 and the air bag 12 firmly between the flange 140 and the first end wall 90 of the diffuser 20. In this manner the end cap 26 blocks the flow of inflation fluid outward from the compartment 196 in the air bag 12 through the openings 116, 198 and 250.

Additionally, the end cap 26 supports the pressure vessel 22 in its position centered on the axis 100 in the chamber 94 when the end cap 26 is in the fastened position at the first end wall 90 of the diffuser 20. The flat surface 172 on the alignment tab 172 in the end cap 26 (FIG. 6) abuts the first flat surface 82 on the manifold 74 (FIG. 4), and the alignment pin 85 on the manifold 74 is closely received in the slot 170 in the alignment structure 68 in the end cap 26. The end cap 26 thus engages the pressure vessel 22 so as to support the pressure vessel 22 in its position centered on the axis 100, and also to block rotation of the pressure vessel 22 about the axis 100 so as to hold the pressure vessel 22 in a predetermined rotational position relative to the diffuser 20 and the end cap 26.

Moreover, when the end cap 26 is moved axially into the fastened position, as indicated by the arrow shown in FIG. 5, the annular and frustoconical surfaces 186 and 188 of the seal 180 are moved axially into abutting engagement with the annular and frustoconical outer end surfaces 86 and 88 of the manifold 74, respectively. The surfaces 186 and 188 of the seal 180 are then pressed firmly against the surfaces 86 and 88 of the manifold 74. The seal 180 thus blocks the flow of inflation fluid outward through the access opening 148 in the end cap 26.

The seal 180 also transmits an axially directed supporting force from the annular inner side surface 149 of the end cap 26 to the manifold 74 when the seal 180 meets the manifold 74 upon movement of the end cap 26 axially into the fastened position. The supporting force which is thus imparted to the pressure vessel 22 by the end cap 26 urges the pressure vessel 22 axially inward of the chamber 94 at the first end wall 90 of the diffuser 20, and urges the pressure vessel 22 axially outward of the chamber 94 at the second end wall 92 of the diffuser 20. The pressure vessel 22 is thus subjected to an axially compressive supporting force along its entire length when it is installed in the chamber 94 in the diffuser 20.

As an additional feature of the present invention, the concave inner surface 166 and the cylindrical inner surface 158 of the end cap are located radially outward of, and extend axially over, the fluid outlet openings 84 in the manifold 74 when the end cap 26 is in the fastened position. As a result, the inflation fluid emitted radially from the outlet openings 84 is deflected axially inward toward the diffuser openings 104 by the inner surfaces 166 and 158 of the end cap 26.

From the above description of the invention, those skilled in the art will perceive improvements, changes and modifications. For example, the configurations of the various surfaces of the end cap 26, the seal 180, and the pressure vessel 22 that register with each other to transmit the supporting force axially from the end cap 26 to the pressure vessel 22 could differ from the configurations described above. Also, an end cap constructed in accordance with the present invention could alternatively be designed to engage a pressure vessel so as to apply an axially directed supporting force directly to the pressure vessel rather than through an elastomeric seal or another separate part of the apparatus. Such improvements, changes and modifications within the skill of the art are intended to be covered by the appended claims.

Having described the invention, the following is claimed:

1. Apparatus comprising:

an inflatable vehicle occupant restraint;

inflator means for providing inflation fluid for inflating said restraint, said inflator means having an axis, a first axial end portion, a second axial end portion, and at least one fluid outlet opening;

a diffuser structure having first and second end portions, said diffuser structure defining a chamber which extends from said first end portion of said diffuser structure to said second end portion of said diffuser structure, said diffuser structure further including fluid outlet means for directing said inflation fluid to flow outward from said chamber; and supporting means for supporting said inflator means in said chamber with said first axial end portion of said inflator means being supported at said first end portion of said diffuser structure, and with said second axial end portion of said inflator means being supported at said second end portion of said diffuser structure;

said supporting means including an end cap and means for fastening said end cap to said first end portion of said diffuser structure in a fastened position in which said end cap imparts an axially directed supporting force to said inflator means, said supporting force urging said inflator means axially inward of said chamber at said first end portion of said diffuser structure and axially outward of said chamber at said second end portion of said diffuser structure;

said end cap having surface means for deflecting said inflation fluid from said end cap toward said fluid outlet means.

2. Apparatus as defined in claim 1 wherein said surface means includes a surface portion of said end cap which extends axially over said inflator means at a location spaced radially outward from said fluid outlet opening when said end cap is in said fastened position.

3. Apparatus as defined in claim 1 wherein said surface means includes a surface portion of said end cap having a concave contour which faces inward of said chamber when said end cap is in said fastened position.

4. Apparatus comprising:

an inflatable vehicle occupant restraint;

inflator means for providing inflation fluid for inflating said restraint, said inflator means having an axis, a first axial end portion, a second axial end portion, and at least one fluid outlet opening;

a structure having first and second end portions, said structure defining a chamber which extends from said first end portion of said structure to said second end portion of said structure, said structure further including fluid outlet means for directing said inflation fluid to flow outward from said chamber; and supporting means for supporting said inflator means in said chamber with said first axial end portion of said inflator means being supported at said first end portion of said structure, and with said second axial end portion of said inflator means being supported at said second end portion of said structure;

said supporting means including an end cap and means for fastening said end cap to said first end portion of said structure in a fastened position in which said end cap imparts an axially directed supporting force to said inflator means, said supporting force urging said inflator means axially inward of said chamber at said first end portion of said structure and axially outward of said chamber at said second end portion of said structure;

said restraint having means for defining a compartment within said restraint in which said inflator means and said structure are contained;

said end cap having surface means for deflecting said inflation fluid from said end cap toward said fluid outlet means.

5. Apparatus as defined in claim 4 wherein said surface means includes a surface portion of said end cap which extends axially over said inflator means at a location spaced radially outward from said fluid outlet opening when said end cap is in said fastened position.

6. Apparatus as defined in claim 4 wherein said surface means includes a surface portion of said end cap having a concave contour which faces inward of said chamber when said end cap is in said fastened position.

7. Apparatus comprising:

an inflatable vehicle occupant restraint;

an inflator comprising means for providing inflation fluid for inflating said restraint, said inflator having an axis, a first axial end portion, a second axial end portion, and at least one fluid outlet opening;

a diffuser structure defining a chamber which extends from a first end portion of said diffuser structure to a second end portion of said diffuser structure, said diffuser structure including fluid outlet means for directing said inflation fluid to flow outward from said chamber; and supporting means for supporting said inflator in said chamber with said first axial end portion of said inflator being supported at said first end portion of said diffuser structure, and with said second axial end portion of said inflator being supported at said second end portion of said diffuser structure;

said supporting means including an end cap and means for fastening said end cap to said first end portion of said diffuser structure in a fastened position in which said end cap imparts an axially directed supporting force to said inflator, said supporting force urging said inflator axially inward of said chamber at said first end portion of said diffuser structure and axially outward of said chamber at said second end portion of said diffuser structure;

said supporting means further including an elastomeric member interposed between said end cap and said inflator, said elastomeric member extending axially between said end cap and said first axial end portion of said inflator so as to transmit said supporting force axially from said end cap to said inflator, said elastomeric member also extending radially between said end cap and said first axial end portion of said inflator so as to support said inflator radially relative to said end cap and said diffuser structure.

8. Apparatus as defined in claim 7 wherein said first end portion of said diffuser structure includes opening means for defining an opening through which said inflator is movable into said chamber toward said second end portion of said diffuser structure, said opening means including a first edge surface at the periphery of said opening, said first axial end portion of said inflator being spaced radially from said first edge surface by said end cap and said elastomeric member.

9. Apparatus as defined in claim 8 wherein said elastomeric member extends circumferentially around said first axial end portion of said inflator and is spaced radially inward from said first edge surface.

10. Apparatus as defined in claim 8 wherein said first edge surface has a contour defining the shape of said opening, said end cap including closing means for closing said opening when said end cap in said fastened position, said closing means including a second edge surface which is radially opposed to said first edge surface, said second edge surface extending alongside said first edge surface and having said contour of said first edge surface.

11. Apparatus as defined in claim 7 wherein said inflator is movable axially into said chamber in a direction extending from said first end portion of said diffuser structure toward said second end portion of said diffuser structure, said supporting means including means for engaging said second axial end portion of said inflator so as to guide such movement of said inflator into said chamber, said means for engaging said second axial end portion of said inflator comprising a plurality of ribs projecting radially inward of said chamber, each of said ribs having a radially inner surface which is elongated in said direction, each of said ribs further having a tapered end surface for guiding said inflator means to move radially between said elongated inner surfaces.

12. Apparatus as defined in claim 7 wherein said diffuser structure further includes means for closing said chamber at said second end portion of said diffuser structure so as to prevent said inflation fluid from exiting said chamber in a direction outward past said second end portion of said diffuser structure, said means for closing said chamber including an end wall of said diffuser structure which is fully continuous transversely across said chamber so as to close said chamber fully across said chamber.

13. Apparatus as defined in claim 7 wherein said inflator comprises a pressure vessel containing pressurized inflation fluid.

14. Apparatus comprising:

a reaction canister;

an inflatable vehicle occupant restraint;

an inflator comprising means for providing inflation fluid for inflating said restraint, said inflator having an axis, a first axial end portion, a second axial end portion, and at least one fluid outlet opening;

a structure defining a chamber which extends from a first end portion of said structure to a second end portion of said structure, said structure including fluid outlet means for directing said inflation fluid to flow outward from said chamber; and supporting means for supporting said inflator in said chamber with said first axial end portion of said inflator being supported at said first end portion of said structure, and with said second axial end portion of said inflator being supported at said second end portion of said structure;

said restraint having means for defining a compartment within said restraint in which said inflator and said structure are contained;

said reaction canister comprising means for containing said restraint, said inflator, and said structure in a vehicle;

said supporting means including an end cap and means for fastening said end cap to said first end portion of said structure in a fastened position in which said end cap imparts an axially directed supporting force to said inflator, said supporting force urging said inflator axially inward of said chamber at said first end portion of said structure and axially outward of said chamber at said second end portion of said structure.

15. Apparatus as defined in claim 14 wherein said restraint, said inflator, said structure, and said supporting means are movable together into said reaction canister when said end cap is fastened to said structure in said fastened position.

16. Apparatus as defined in claim 15 further comprising a cover comprising means for containing said restraint, said inflator, and said structure within said reaction canister, said cover being rupturable by said restraint upon inflation of said restraint outward from said reaction canister.

17. Apparatus as defined in claim 16 in which said cover and said restraint are attached to said structure.

18. Apparatus as defined in claim 15 wherein said inflator comprises a pressure vessel containing pressurized inflation fluid.

* * * * *